US011102057B2

(12) United States Patent
Tang

(10) Patent No.: US 11,102,057 B2
(45) Date of Patent: Aug. 24, 2021

(54) TERMINAL DEVICE AND METHOD FOR PROCESSING RADIO LINK FAILURE TO IMPROVE TRANSMISSION EFFICIENCY

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 45 days.

(21) Appl. No.: 16/621,674

(22) PCT Filed: Jul. 24, 2017

(86) PCT No.: PCT/CN2017/094160
§ 371 (c)(1),
(2) Date: Dec. 11, 2019

(87) PCT Pub. No.: WO2019/018989
PCT Pub. Date: Jan. 31, 2019

(65) Prior Publication Data
US 2020/0127886 A1    Apr. 23, 2020

(51) Int. Cl.
*H04L 12/24* (2006.01)
*H04W 76/19* (2018.01)
(Continued)

(52) U.S. Cl.
CPC ..... *H04L 41/0668* (2013.01); *H04W 72/0453* (2013.01); *H04W 76/19* (2018.02);
(Continued)

(58) Field of Classification Search
CPC .. H04L 41/0668; H04W 76/19; H04W 76/24; H04W 76/27; H04W 72/0453; H04W 80/02; H04W 88/06
See application file for complete search history.

(56) References Cited

U.S. PATENT DOCUMENTS

| 2013/0010641 A1* | 1/2013 | Dinan | H04W 36/0072 |
| | | | 370/254 |
| 2014/0050102 A1* | 2/2014 | Lee | H04W 76/19 |
| | | | 370/242 |

(Continued)

FOREIGN PATENT DOCUMENTS

| CN | 103906152 A | 7/2014 |
| CN | 105393582 A | 3/2016 |
| WO | 2016061390 A1 | 4/2016 |

OTHER PUBLICATIONS

3GPP TSG-RAN WG2 NR Ad Hoc #2; Qingdao, China, Jun. 27-29, 2017; R2-1707340.
(Continued)

*Primary Examiner* — Mewale A Ambaye
(74) *Attorney, Agent, or Firm* — Young Basile Hanlon & MacFarlane, P.C.

(57) ABSTRACT

Implementations of the present disclosure relate to a method for processing radio link failure (RLF) and a terminal device. The method includes: a terminal device sends same packet data convergence protocol (PDCP) layer data to a network device through a primary carrier and a secondary carrier; the terminal device determines that an RLF event occurs on the secondary carrier when a number of transmissions of an acknowledged mode data (AMD) protocol data unit (PDU) in a radio link control (RLC) entity corresponding to the secondary carrier reaches to a maximum number of transmissions, and sends first radio resource control (RRC) reconfiguration information to the network device,
(Continued)

wherein the first RRC reconfiguration information is used for RRC connection reconfiguration performed by the terminal device with the network device.

18 Claims, 3 Drawing Sheets

(51) Int. Cl.
  *H04W 76/27* (2018.01)
  *H04W 72/04* (2009.01)
  *H04W 80/02* (2009.01)
  *H04W 88/06* (2009.01)
(52) U.S. Cl.
  CPC ............ *H04W 76/27* (2018.02); *H04W 80/02* (2013.01); *H04W 88/06* (2013.01)

(56) References Cited

U.S. PATENT DOCUMENTS

| | | | |
|---|---|---|---|
| 2016/0037579 A1 | 2/2016 | Jung et al. | |
| 2018/0270792 A1* | 9/2018 | Park | H04W 76/28 |
| 2018/0279168 A1* | 9/2018 | Jheng | H04W 28/04 |
| 2018/0310202 A1* | 10/2018 | Lohr | H04W 76/19 |
| 2019/0082363 A1* | 3/2019 | Park | H04W 76/18 |

OTHER PUBLICATIONS

Extended European Search Report for EP Application 17919441.0 dated Jul. 6, 2020.
Indian Examination Report for IN Application 201917054307 dated May 11, 2021. (6 pages).

* cited by examiner

100

A terminal device sends same PDCP layer data to a network device through a primary carrier and a secondary carrier ⏤S110

The terminal device determines that an RLF event occurs on the secondary carrier when a number of transmissions of an AMD PDU in an RLC entity corresponding to the secondary carrier reaches to a maximum number of transmissions, and sends first RRC reconfiguration information to the network device, wherein the first RRC reconfiguration information is used for RRC connection reconfiguration performed by the terminal device with the network device. ⏤S120

FIG. 1

TERMINAL DEVICE AND METHOD FOR PROCESSING RADIO LINK FAILURE TO IMPROVE TRANSMISSION EFFICIENCY

CROSS-REFERENCE TO RELATED APPLICATION(S)

This application is a 371 application of International Application No. PCT/CN2017/094160, filed on Jul. 24, 2017, the entire disclosure of which is hereby incorporated by reference.

TECHNICAL FIELD

The present disclosure relates to the field of communication, in particular to a method for processing radio link failure and a terminal device.

BACKGROUND

In a long term evolution (LTE) system, when a radio link control (RLC) entity is in an acknowledged mode (AM), and the number of transmissions of an AM data (AMD) protocol data unit (PDU) reaches to a maximum number of automatic repeat request (ARQ) retransmissions, a radio link failure (RLF) event is triggered, and the RLC entity reports to a network device.

In LTE, a user equipment (UE) triggers an RLF event when a maximum number of retransmissions of an AMD PDU occurs in an RLC entity of a master cell group (MCG) or in an RLC entity of a secondary cell group (SCG).

In new radio (NR), for transmission of duplicated data under a carrier aggregation (CA) scenario, a packet data convergence protocol layer sends generated and duplicated data (i.e., PDCP PDU and duplicated PDCP PDU) to two different RLC entities respectively, and the two RLC entities are mapped to different physical layer carriers, such as a primary carrier (PCELL) and a secondary carrier (SCELL), through which the duplicated data is transmitted. In the existing method for processing RLF in the LTE, if the RLF occurs in the MCG, Radio Resource Control (RRC) connection release or RRC connection re-establishment will be performed. For the CA scenario in the NR, if an RLF event occurs in an RLC entity mapped to a secondary carrier or a primary carrier, how to handle the RLF event needs to be reconsidered.

SUMMARY

The present disclosure provides a method for processing radio link failure (RLF) and a terminal device, which can improve transmission efficiency.

In a first aspect, there is provided a method for processing radio link failure (RLF), and the method includes: sending, by a terminal device, same packet data convergence protocol (PDCP) layer data to a network device through a primary carrier and a secondary carrier; when a number of transmissions of an acknowledged mode data (AMD) protocol data unit (PDU) in a radio link control (RLC) corresponding to a secondary carrier reaches to a maximum number of transmissions, determining, by the terminal device that an RLF event occurs on the secondary carrier, and sending first radio resource control (RRC) reconfiguration information to the network device, wherein the first RRC reconfiguration information is used for RRC connection reconfiguration performed by the terminal device with the network device.

In combination with the first aspect, in an implementation of the first aspect, the method further includes: receiving, by the terminal device, first carrier configuration information sent by the network device according to the first RRC reconfiguration information, wherein the first carrier configuration information is used for indicating a first carrier; sending, by the terminal device, the same PDCP layer data to the network device through the first carrier instead of the secondary carrier on which the RLF event occurs.

In combination with the first aspect and the above implementation thereof, in another implementation of the first aspect, the method further comprises: sending, by the terminal device, first RLF type indication information to the network device, wherein the first RLF type indication information is used for indicate that a carrier on which the RLF event occurs is the secondary carrier.

In combination with the first aspect and the above implementation thereof, in another implementation of the first aspect, the method further includes: suspending, by the terminal device, transmission of data of all RLC entities mapped to the secondary carrier in the situation that the RLF event occurs on the secondary carrier.

In combination with the first aspect and the above implementation thereof, in another implementation of the first aspect, the method further includes: suspending, by the terminal device, transmission of data of at least one RLC entity mapped to the secondary carrier in the situation that the RLF event occurs on the secondary carrier, wherein a number of transmissions of an AMD PDU in each RLC entity of the at least one RLC entity reaches to a maximum number of retransmissions.

In combination with the first aspect and the above implementation thereof, in another implementation of the first aspect, the method further includes: maintaining, by the terminal device, a operation of a medium access control (MAC) entity in the situation that the RLF event occurs on the secondary carrier.

In combination with the first aspect and the above implementation thereof, in another implementation of the first aspect, the method further includes: duplicating and transmitting, by the terminal device, a signaling radio bearer (SRB) carried by the secondary carrier with the network device through the primary carrier in the situation that the RLF event occurs on the secondary carrier.

In combination with the first aspect and the above implementation thereof, in another implementation of the first aspect, the method further includes: determining that an RLF event occurs in the primary carrier when a number of transmissions of an AMD PDU in an RLC entity corresponding to the primary carrier reaches to a maximum number of transmissions, and sending an RRC re-establishment request message to the network device, wherein the RRC re-establishment request message is used for requesting RRC re-establishment with the network device.

In combination with the first aspect and the above implementation thereof, in another implementation of the first aspect, the primary carrier is a primary carrier in a master cell group (MCG), and the secondary carrier is a secondary carrier in the MCG; or, the primary carrier is a primary carrier in a secondary cell group (SCG), and the secondary carrier is a secondary carrier in the SCG.

In combination with the first aspect and the above implementation thereof, in another implementation of the first aspect, the primary carrier is a primary carrier in the SCG, and the secondary carrier is a secondary carrier in the SCG, the method further includes: determining, by the terminal device, that an RLF event occurs in the primary carrier in the SCG when a number of transmissions of an AMD PDU in an RLC entity corresponding to the primary carrier in the SCG reaches to a maximum number of transmissions, and sending second RRC reconfiguration information to the network device, wherein the second RRC reconfiguration information is used for RRC connection reconfiguration performed by the terminal device with the network device.

In combination with the first aspect and the above implementation thereof, in another implementation of the first aspect, the method further includes: receiving, by the terminal device, second carrier configuration information sent by the network device according to the second RRC reconfiguration information, wherein the second carrier configuration information is used for indicating a second carrier; sending, by the terminal device, the same PDCP layer data to the network device through the second carrier instead of the primary carrier in the SCG on which the RLF event occurs.

In combination with the first aspect and the above implementation thereof, in another implementation of the first aspect, the method further includes: sending, by the terminal device, second RLF type indication information to the network device, wherein the second RLF type indication information is used for indicating that a carrier on which the RLF event occurs is a primary carrier in the SCG.

In a second aspect, a terminal device is provided, which is used for performing the method of the above first aspect or the method in any possible implementation of the above first aspect. Specifically, the terminal device includes units for executing the method of the above first aspect or the method in any possible implementation of the above first aspect.

In a third aspect, a terminal device is provided, which includes a memory and a processor, the memory is used for storing instructions, the processor is used for executing the instructions stored in the memory, and when the processor executes the instructions stored in the memory, the execution causes the processor to execute the method of the first aspect or the method in any possible implementation of the first aspect.

In a fourth aspect, a computer readable medium is provided, which is used for storing a computer program, the computer program includes instructions for executing the method of the first aspect or the method in any possible implementation of the first aspect.

In a fifth aspect, a computer program product including instructions is provided, when a computer runs the instructions of the computer program product, the computer performs the method for processing RLF in the above first aspect or in any possible implementation of the above first aspect. Specifically, the computer program product may be run on the terminal device of the above third aspect.

BRIEF DESCRIPTION OF DRAWINGS

FIG. 1 is a schematic flow chart of a method for processing RLF according to an implementation of the present disclosure.

DETAILED DESCRIPTION

Hereinafter, technical solutions in implementations of the present disclosure will be described with reference to accompanying drawings.

It should be understood that the technical solutions of the implementations of the present disclosure may be applied to various communication systems, for example, a long term evolution (LTE) system, an LTE frequency division duplex (FDD) system, an LTE time division duplex (TDD) system, a 4.5th generation (4.5G) network, a 5th generation (5G) network, and a new radio (NR) network.

A terminal device in the implementations of the present disclosure may also be referred to as a terminal, a user equipment (UE), a mobile station (MS), a mobile terminal (MT), etc. The terminal device may be a mobile phone, a tablet computer (Pad), a computer with a wireless transceiving function, a Virtual Reality (VR) terminal device, an Augmented Reality (AR) terminal device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, etc.

The network device involved in the implementations of the present disclosure is an apparatus deployed in a wireless access network to provide wireless communication functions for a terminal device. The network device may be a base station, which may include various forms of macro base stations, micro base stations, relay stations, access points, etc. In systems adopting different radio access technologies, names of devices having the function of a base station may be different. For example, in an LTE network, it is called evolved node B (eNB or eNodeB), and in 3rd Generation (3G) network, it is called node B, etc.

The base station and terminal device may be deployed on land, including indoors or outdoors, hand-held or vehicle-mounted; or may be deployed on water surface; or may be deployed on a plane, a balloon and a satellite in air. Implementations of the present disclosure do not limit application scenarios of the base station and the terminal device.

FIG. 1 is a schematic flow chart of a method 100 for processing RLF according to an implementation of the present disclosure, and the method 100 may be performed by a terminal device.

As shown in FIG. 1, the method 100 includes S110: a terminal device sends same PDCP layer data to a network device through a primary carrier and a secondary carrier.

It should be understood that the implementation of the present disclosure may be used for duplication and transmission under a CA scenario. The primary carrier and secondary carrier used by the terminal device to send the same PDCP layer data may refer to one or more carriers respectively, that is, the primary carrier may be one carrier or a carrier group including a plurality of carriers, and the secondary carrier may be one carrier or a carrier group including a plurality of carriers.

Figure 2:
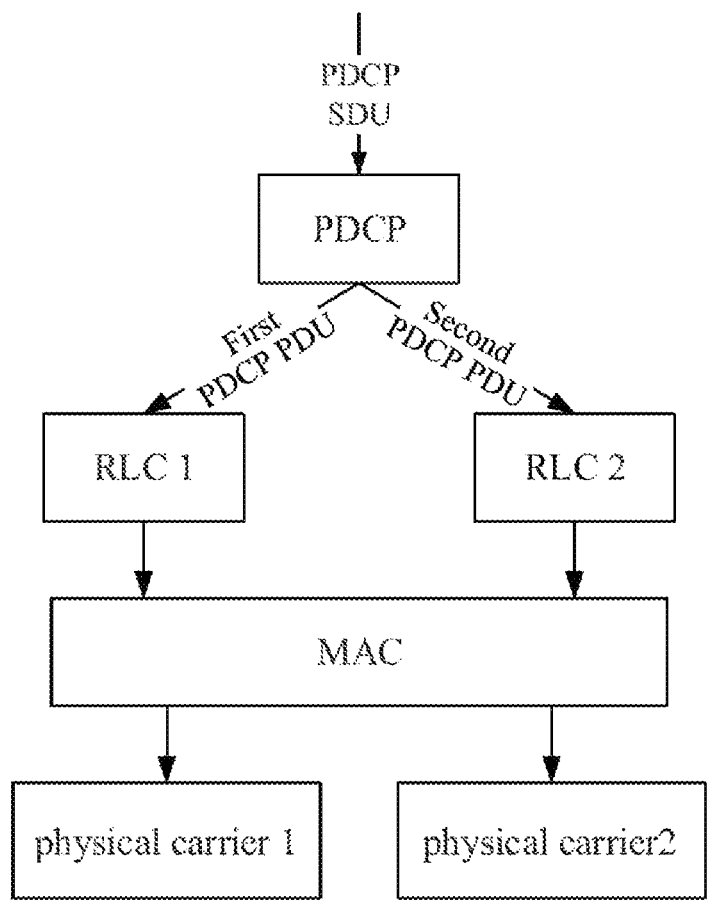
FIG. 2 is a schematic diagram of duplication and transmission of PDCP layer data according to an implementation of the present disclosure.

In the implementation of the present disclosure, sending the same PDCP layer data in S110 refers to duplicated transmission of a PDCP layer packet. Specifically, FIG. 2 is a schematic diagram of duplication and transmission of PDCP layer data according to an implementation of the present disclosure. As shown in FIG. 2, one PDCP entity is bound to two RLC entities. The terminal device duplicates a first PDCP PDU to be transmitted to obtain a second PDCP PDU. The terminal device sends the first PDCP PDU to RLC 1 that is one RLC entity of the two RLC entities, and sends the second PDCP PDU to RLC2 that is the other RLC entity of the two RLC entities. The two RLC entities respectively process the received PDCP PDU, and send the first PDCP PDU and the second PDCP PDU to the network device through two different carriers. For example, as shown in FIG. 2, the first PDCP PDU and the second PDCP PDU are respectively sent through carrier 1 and carrier 2, wherein the carrier 1 may be a primary carrier and the carrier 2 may be a secondary carrier. The process of the two RLC entities processing the received PDCP PDU is the same as that of a single RLC entity processing the PDCP PDU without duplicated transmission in the prior art, thus it is not redundantly repeated here.

Optionally, the terminal device may send the PDCP layer data through more than two carriers, and the terminal device may send the same packet to the network device through M carriers, where M is a positive integer greater than or equal to 3. In this situation, the terminal device may duplicate the PDCP PDU to be transmitted to obtain M packets including the PDCP PDU to be transmitted, and respectively transmit the M same packets to the network device through M carriers, thereby improving reliability of data transmission. The method for the terminal device to process RLF when sending the same packet to the network device through the M carriers is similar to the method for the terminal device to process RLF when sending the same data packet to the network device through two carriers. In other words, the primary carrier may be any one primary carrier of the M carriers, and the secondary carrier may be any one secondary carrier of the M carriers.

It should be understood that the RLC entity used by the terminal device to perform the duplication and transmission function may be configured by the network device through an RRC signaling. For example, the network device may configure that the terminal device may use five RLC entities for duplication and transmission, and two of the five RLC entities are in an active state, then the terminal device may use the two RLC entities for duplication and transmission.

In the situation of duplicated transmission of a PDCP PDU layer packet, the terminal device duplicates a first PDCP PDU to be transmitted to obtain a second PDCP PDU. The terminal device sends the first PDCP PDU and the second PDCP PDU to two RLC entities respectively, and each RLC entity processes the received PDCP PDU and sends it to an MAC entity. The MAC entity processes packets sent by the two RLC layers respectively, and then send the two RLC layer packets to the network device through two different carriers. The process of the MAC layer entity processing the RLC layer packets is the same as the process of the MAC entity processing the RLC layer packets when duplicated transmission is not performed, which is not redundantly repeated here.

It can be understood that the duplicated transmission of packets or the duplicated transmission in the packet duplicated transmission function in the implementation of the present disclosure refers to duplicating a packet to obtain two or more same packets, and respectively sending the two or more same packets with different carriers. The duplicated transmission mentioned in the implementation of the present disclosure does not refer to the retransmission of the packet in mechanisms such as the automatic repeat request mechanism.

Optionally, in other implementations, such as in a dual-connectivity scenario, the above carriers may refer to links with different network devices. For example, the primary carrier may be a primary carrier in an MCG, and the secondary carrier may a secondary carrier in the MCG; or the primary carrier may be a primary carrier in an SCG, and the secondary carrier may be a secondary carrier in the SCG, and the implementations of the present disclosure are not limited thereto.

The method 100 further includes S120: the terminal device determines that an RLF event occurs on the secondary carrier when the number of transmissions of an AMD PDU in an RLC entity corresponding to the secondary carrier reaches to a maximum number of transmissions, and sends first RRC reconfiguration information to the network device, wherein the first RRC reconfiguration information is used for RRC connection reconfiguration performed by the terminal device with the network device.

It should be understood that in a dual connectivity scenario, the primary carrier may be a primary carrier in an MCG, or may be a primary carrier in an SCG. Correspondingly, the secondary carrier may be a secondary carrier in an MCG, or may be a secondary carrier in an SCG. Therefore, determining, by the terminal device, that the RLF event occurs on the secondary carrier further includes: the terminal device specifically determines that the RLF event occurs on a secondary carrier in an MCG, or the RLF event occurs on a secondary carrier in an SCG.

It should be understood that in the situation that the RLF event occurs on the secondary carrier, the first RRC reconfiguration information sent by the terminal device to the network device may be used for RRC connection reconfiguration performed by the terminal device with the network device, wherein the RRC connection reconfiguration process may be the same as that in the prior art, specifically, it may be the same as the RRC connection reconfiguration process when an RLF event occurs on a carrier in an SCG in the prior art, and will not be repeated here.

Optionally, in an implementation, performing, by the terminal device, the RRC connection reconfiguration with the network device may include: the terminal device sends first RRC reconfiguration information to the network device, and the network device stops transmitting duplicated data according to the first RRC reconfiguration information, that is, stops transmitting data through the secondary carrier on which the RLF event occurs, releases a mapping relationship between the RLC entity and the secondary carrier, reconfigures another new carrier for the RLC entity, for example, configures a first carrier for the RLC entity, and sends first carrier configuration information to the terminal device, and the first carrier configuration information is used for indicating the first carrier. Then the terminal device receives the first carrier configuration information sent by the network device according to the first RRC reconfiguration information, wherein the first carrier configuration information is used for indicating the first carrier, and the terminal device replaces the secondary carrier on which the RLF occurs with the first carrier, sends the PDCP layer data to the network device through the first carrier, and restarts the transmission of duplicated data.

In the implementation of the present disclosure, the terminal device may send first RLF type indication information to the network device in the situation that the RLF event occurs on the secondary carrier, and the first RLF type indication information is used for indicating that a carrier on which the RLF event occurs is a secondary carrier.

In the implementation of the present disclosure, in the situation that the RLF event occurs on the secondary carrier, transmission of data of the RLC entity mapped to the secondary carrier may be only suspended, i.e., the secondary carrier is suspended without affecting transmission of data of the primary carrier. Specifically, in the situation that the RLF event occurs on the secondary carrier, the secondary carrier may be a secondary carrier in an MCG or may be a secondary carrier in an SCG, and transmission of data of all RLC entities mapped to the secondary carrier may be suspended; or transmission of data of a part of RLC entities mapped to the secondary carrier may be suspended, that is, to suspend the transmission of data of at least one RLC entity mapped to the secondary carrier, and the number of transmissions of an AMD PDU in each RLC entity in the at least one RLC entity reaches to a maximum number of retransmissions.

Optionally, in the situation that the RLF event occurs on the primary carrier, transmission of data of the RLC entity mapped to the primary carrier may be suspended, and transmission of data of the RLC entity mapped to the corresponding secondary carrier may be suspended, that is, the primary carrier and the secondary carrier are suspended simultaneously.

In the implementation of the present disclosure, in the situation that the RLF event occurs on the secondary carrier, an operation of an MAC entity may be continuously maintained, so that transmission of data on the primary carrier is not affected. Specifically, when an RLF event occurs in a secondary carrier, the secondary carrier may be a secondary carrier in an MCG or may be a secondary carrier in an SCG, the operation of the MAC entity may be maintained without resetting the MAC entity.

Optionally, when an RLF event occurs in a primary carrier, the MAC entity needs to be reset, wherein the primary carrier may be a primary carrier in an MCG or may be a primary carrier in an SCG.

In the implementation of the present disclosure, the terminal device may use the secondary carrier to carry a radio bearer signaling (SRB). When an RLF event occurs on the secondary carrier used to carry the SRB, the terminal device may duplicate and transmit the SRB carried by the secondary carrier through the primary carrier. The implementation of the present disclosure is not limited to this.

Optionally, if the secondary carrier where the RLF event occurs does not carry the SRB, the normal transmission of the SRB will not be affected.

In an implementation of the present disclosure, the method 100 further includes: the terminal device determines that an RLF event occurs in a primary carrier when the number of transmissions of an AMD PDU in an RLC entity of the primary carrier reaches to a maximum number of transmissions, wherein the primary carrier may be a primary carrier in an MCG or may be a primary carrier in an SCG.

Optionally, in an implementation, when an RLF event occurs in a primary carrier, an RRC re-establishment request message may be sent to the network device, and the RRC re-establishment request message is used for requesting to perform RRC re-establishment with the network device. The network device determines that the carrier on which the RLF event occurs is a primary carrier, and determines to perform the RRC re-establishment with the terminal device according to the RRC re-establishment request message, then may return RRC re-establishment information to the terminal device for RRC re-establishment with the terminal device; or the network may refuse RRC re-establishment with the terminal according to the RRC re-establishment request message. The RRC re-establishment may be RRC connection release or RRC connection re-establishment. Optionally, the primary carrier may be a primary carrier in an MCG.

It should be understood that the process of the terminal device performing the RRC re-establishment with the network device in the situation that the RLF event occurs on the primary carrier may be the same as the process of RRC re-establishment in the situation that the RLF event occurs on a carrier in an MCG in the prior art, and will not be repeated here.

Optionally, in an implementation, when an RLF event occurs on the primary carrier, the primary carrier may be a primary carrier in an SCG, the terminal device may send second RRC reconfiguration information to the network device. The second RRC reconfiguration is used for RRC connection reconfiguration performed by the terminal device with the network device. Specifically, the process of the RRC reconfiguration is the same as that in the prior art, for example, the process of the RRC reconfiguration is the same as the process of the RRC configuration required by the occurrence of an RLF event on a carrier in an SCG in the prior art, and will not be repeated here.

Optionally, in an implementation, in the process of the RRC connection reconfiguration performed by the terminal device with the network device, the terminal device may receive second carrier configuration information sent by the network device according to the second RRC reconfiguration information. The second carrier configuration information is used for indicating a second carrier, and the terminal device may replace the primary carrier in the SCG on which the RLF event occurs with the second carrier, and continue to transmit the same PDCP layer data with the network device.

Optionally, the terminal device may further send second RLF type indication information to the network device. The second RLF type indication information is used for indicating that a carrier on which the RLF event occurs is a primary carrier in an SCG.

Therefore, in the method for processing RLF according to the implementation of the present disclosure, the terminal device may transmit the same data with the network device through the primary carrier and the secondary carrier, when an RLF event occurs in an RLC entity corresponding to the primary carrier or the secondary carrier, determine different processing modes according to different carrier types, and perform RRC connection reconfiguration or RRC re-establishment with the network device, thereby increasing flexibility of data transmission and improving transmission efficiency.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The method for processing RLF according to the implementations of the present disclosure is described in detail above with reference to FIG. 1 to FIG. 2. A terminal device and a network device according to implementations of the present disclosure will be described below with reference to FIG. 3 to FIG. 4.

Figure 3:
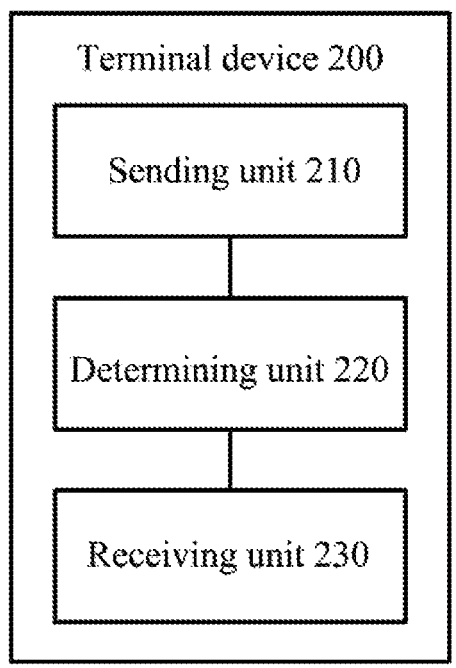
FIG. 3 is a schematic block diagram of a terminal device according to an implementation of the present disclosure.

As shown in FIG. 3, a terminal device 200 according to an implementation of the present disclosure includes a sending unit 210 and a determining unit 220, optionally further includes a receiving unit 230.

The sending unit 210 is used for sending same PDCP layer data to a network device through a primary carrier and a secondary carrier. The determining unit 220 is used for, determining that an RLF event occurs on the secondary carrier when a number of transmissions of an AMD PDU in an RLC entity corresponding to the secondary carrier reaches to a maximum number of transmissions, and send first RRC reconfiguration information to the network device through the sending unit, wherein the first RRC reconfiguration information is used for RRC connection reconfiguration performed by the terminal device with the network device.

Therefore, the terminal device of the implementation of the present disclosure may send the same data with the network device through the primary carrier and the secondary carrier, when an RLF event occurs in an RLC entity corresponding to the primary carrier or the secondary carrier, determine different processing modes according to different carrier types, and perform RRC connection reconfiguration or RRC re-establishment with the network device, thereby increasing flexibility of data transmission and improving transmission efficiency.

Optionally, the receiving unit 230 is used for receiving first carrier configuration information sent by the network device according to the first RRC reconfiguration information. The first carrier configuration information is used for indicating a first carrier. The sending unit 210 is specifically used for sending the same PDCP layer data to the network device through the first carrier instead of the secondary carrier on which the RLF event occurs.

Optionally, the sending unit 210 is specifically used for sending first RLF type indication information to the network device. The first RLF type indication information is used for indicating that the carrier on which the RLF event occurs is the secondary carrier.

Optionally, the determining unit 220 is specifically used for suspending transmission of data of all RLC entities mapped to the secondary carrier in the situation that the RLF event occurs on the secondary carrier.

Optionally, the determining unit 220 is specifically used for suspending transmission of data of at least one RLC entity mapped to the secondary carrier in the situation that the RLF event occurs on the secondary carrier, and a number of transmissions of an AMD PDU in each RLC entity of the at least one RLC entity reaches to a maximum number of retransmissions.

Optionally, the determining unit 220 is specifically used for maintaining an operation of a medium access control (MAC) entity in the situation that the RLF event occurs on the secondary carrier.

Optionally, the sending unit 210 is specifically used for duplicating and transmitting a signaling radio bearer (SRB) carried by the secondary carrier with the network device in the situation that the RLF event occurs on the secondary carrier.

Optionally, the determining unit 220 is specifically used for determining that an RLF event occurs on the primary carrier when a number of transmissions of an AMD PDU in an RLC entity corresponding to the primary carrier reaches to a maximum number of transmissions, and sending an RRC re-establishment request message to the network device through the sending unit 210, and the RRC re-establishment request message is used for requesting RRC re-establishment performed with the network device.

Optionally, the primary carrier is a primary carrier in an MCG, and the secondary carrier is a secondary carrier in the MCG; or, the primary carrier is a primary carrier in an SCG, and the secondary carrier is a secondary carrier in the SCG.

Optionally, the primary carrier is a primary carrier in an SCG, and the secondary carrier is a secondary carrier in the SCG. The determining unit 220 is specifically used for determining that the RLF occurs on the primary carrier in the SCG when a number of transmissions of an AMD PDU in an RLC entity corresponding to the primary carrier of the SCG reaches to a maximum number of transmissions, and sending second RRC reconfiguration information to the network device through the sending unit 210. The second RRC reconfiguration information is used for RRC connection reconfiguration performed by the terminal device with the network device.

Optionally, the receiving unit 230 is used for receiving second carrier configuration information sent by the network device according to the second RRC reconfiguration information. The second carrier configuration information is used for indicating a second carrier. The sending unit 210 is specifically used for sending the same PDCP layer data to the network device through the second carrier instead of the primary carrier in the SCG on which the RLF event occurs.

Optionally, the sending unit 210 is specifically used for sending second RLF type indication information to the network device. The second RLF type indication information is used for indicating that the carrier on which the RLF event occurs is a primary carrier in an SCG.

It should be understood that the terminal device 300 according to the implementation of the present disclosure may correspondingly perform the method 100 in the implementation of the present disclosure, and the above operations and/or functions and other operations and/or functions of each unit in the terminal device 300 are respectively for realizing each corresponding flow of the terminal device of the method in FIG. 1 to FIG. 2, and will not be repeated here for the sake of brevity.

Therefore, the terminal device of the implementation of the present disclosure may send the same data with the network device through the primary carrier and the secondary carrier, when an RLF event occurs in an RLC entity corresponding to the primary carrier or the secondary carrier, determine different processing modes according to different carrier types, and perform RRC connection reconfiguration or RRC re-establishment with the network device, thereby increasing flexibility of data transmission and improving transmission efficiency.

Figure 4:
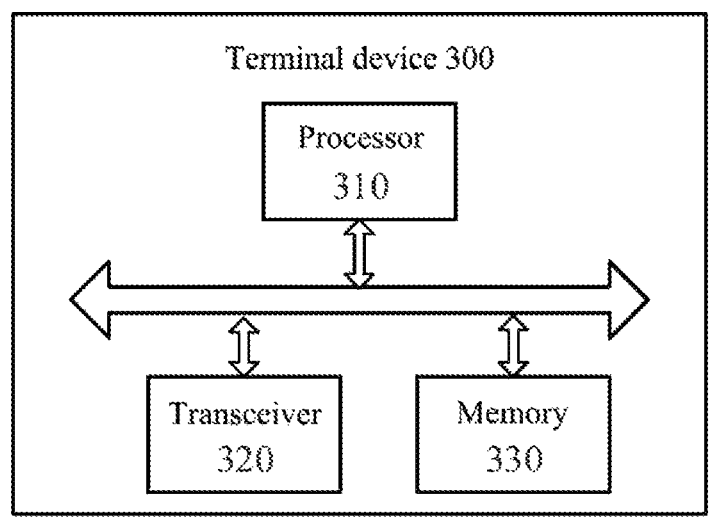
FIG. 4 is another schematic block diagram of a terminal device according to an implementation of the present disclosure.

FIG. 4 is a schematic block diagram of a terminal device according to an implementation of the present disclosure. As shown in FIG. 4, a network device 300 includes a processor 310 and a transceiver 320, and the processor 310 and the transceiver 320 are connected. Optionally, the terminal device 300 further includes a memory 330 connected to the processor 310. The processor 310, the memory 330 and the transceiver 320 communicate with each other through an internal connection path to transfer control signals and/or data signals. The memory 330 may be used for storing instructions. The processor 310 is used for executing the instructions stored in the memory 330 to control the transceiver 320 to send information or signals. The transceiver 320 is used for sending the same PDCP layer data to a network device through a primary carrier and a secondary carrier. The processor 310 is used for: when a number of transmissions of an AMD PDU in an RLC entity corresponding to the secondary carrier reaches to a maximum number of transmissions, determining that an RLF event occurs on the secondary carrier, and sending first RRC reconfiguration information to the network device through the transceiver 320, wherein the first RRC reconfiguration information is used for RRC connection reconfiguration performed by the terminal device and the network device.

Therefore, the terminal device of the implementation of the present disclosure may send the same data with the network device through the primary carrier and the secondary carrier, when an RLF event occurs in an RLC entity corresponding to the primary carrier or the secondary carrier, determine different processing modes according to different carrier types, and perform RRC connection reconfiguration or RRC re-establishment with the network device, thereby increasing flexibility of data transmission and improving transmission efficiency.

Optionally, in an implementation, the transceiver 320 is used for receiving first carrier configuration information sent by the network device according to the first RRC reconfiguration information, wherein the first carrier configuration information is used for indicating a first carrier, sending the same PDCP layer data to the network device through the first carrier instead of the secondary carrier on which the RLF event occurs.

Optionally, in an implementation, the transceiver 320 is used for sending first RLF type indication information to the network device. The first RLF type indication information is used for indicating that the carrier on which the RLF event occurs is a secondary carrier.

Optionally, in an implementation, the processor 310 is used for suspending transmission of data of all RLC entities mapped to the secondary carrier in the situation that the RLF event occurs on the secondary carrier.

Optionally, in an implementation, the processor 310 is used for suspending transmission of data of at least one RLC entity mapped to the secondary carrier in the situation that the RLF event occurs on the secondary carrier, and a number of transmissions of an AMD PDU in each RLC entity of the at least one RLC entity reaches to a maximum number of retransmissions.

Optionally, in an implementation, the processor 310 is used for maintaining an operation of a medium access control (MAC) entity in the situation that the RLF event occurs on the secondary carrier.

Optionally, in an implementation, the transceiver 320 is used for duplicating and transmitting a signaling radio bearer (SRB) carried by the secondary carrier with the network device through the primary carrier in the situation that the RLF event occurs on the secondary carrier.

Optionally, in an implementation, the processor 310 is used for determining that an RLF event occurs on the primary carrier in a situation that a number of transmissions of an AMD PDU in an RLC entity corresponding to the primary carrier reaches to a maximum number of transmissions, and sending an RRC reestablishment request message to the network device through the transceiver 320. The RRC reestablishment request message is used for requesting RRC reestablishment with the network device.

Optionally, in an implementation, the primary carrier is a primary carrier in an MCG, and the secondary carrier is a secondary carrier in the MCG; or, the primary carrier is a primary carrier in an SCG, and the secondary carrier is a secondary carrier in the SCG.

Optionally, in an implementation, the primary carrier is a primary carrier in an SCG, and the secondary carrier is a secondary carrier in the SCG. The processor 310 is used for determining that an RLF event occurs on the primary carrier in the SCG when a number of transmissions of an AMD PDU in an RLC entity corresponding to the primary carrier in the SCG reaches to a maximum number of transmissions, and sending second RRC reconfiguration information to the network device through the transceiver 320. The second RRC reconfiguration information is used for RRC connection reconfiguration performed by the terminal device with the network device.

Optionally, in an implementation, the transceiver 320 is used for receiving second carrier configuration information sent by the network device according to the second RRC reconfiguration information, wherein the second carrier configuration information is used for indicating a second carrier, and sending the same PDCP layer data to the network device through the second carrier instead of the primary carrier in the SCG on which the RLF event occurs.

Optionally, in an implementation, the transceiver 320 is used for sending second RLF type indication information to the network device. The second RLF type indication information is used for indicating that the carrier on which the RLF event occurs is a primary carrier in the SCG.

It should be understood that the terminal device 300 according to the implementation of the present disclosure may correspond to the terminal device 200 in the implementation of the present disclosure and may correspond to a relevant subject that performs the method 100 according to the implementation of the present disclosure, and the above and other operations and/or functions of each unit in the terminal device 300 are respectively for realizing each corresponding flow of the terminal device in the method shown in FIG. 1, and will not be repeated here for the sake of brevity.

Therefore, the terminal device of the implementation of the present disclosure may send the same data with the network device through the primary carrier and the secondary carrier, when an RLF event occurs in an RLC entity corresponding to the primary carrier or the secondary carrier, determine different processing modes according to different carrier types, and perform RRC connection reconfiguration or RRC re-establishment with the network device, thereby increasing flexibility of data transmission and improving transmission efficiency.

It should be noted that the above method implementations of the present disclosure can be applied to or implemented by a processor. The processor may be an integrated circuit chip with signal processing capability. In the implementation process, the actions of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The actions of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example but not a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAIVI), a Synchlink DRAM (SLDRAIVI), and a Direct Rambus RAM (DR RAM). It should be noted that the memories of the systems and methods described herein are intended to include, but are not limited to, these and any other suitable types of memories.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled artisans may use different approaches to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the implementations of methods described above, and details are not described herein again.

In several implementations provided by the present disclosure, it should be understood that the disclosed system, device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be distributed over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include U disk, mobile hard disk, read-only memory (ROM), random access memory (RAM), magnetic disk or optical disk, and other media capable of storing program codes.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for processing radio link failure (RLF), comprising:
   sending, by a terminal device, same packet data convergence protocol (PDCP) layer data to a network device through a primary carrier and a secondary carrier;
   when a number of transmissions of an acknowledged mode data (AMD) protocol data unit (PDU) in a radio link control (RLC) entity corresponding to the secondary carrier reaches to a maximum number of transmissions, determining, by the terminal device, that a RLF event occurs on the secondary carrier, and sending first radio resource control (RRC) reconfiguration information to the network device, wherein the first RRC reconfiguration information is used for RRC connection reconfiguration performed by the terminal device with the network device,
   wherein the primary carrier is a primary carrier in a secondary cell group (SCG), and the secondary carrier is a secondary carrier in the SCG; and the method further comprises:
   when the number of transmissions of the AMD PDU in the RLC entity corresponding to the primary carrier in the SCG reaches to the maximum number of transmissions, determining, by the terminal device, that the RLF event occurs on the primary carrier in the SCG, and sending second RRC reconfiguration information to the network device, wherein the second RRC reconfiguration information is used for RRC connection reconfiguration performed by the terminal device with the network device.

2. The method according to claim 1, further comprising:
   receiving, by the terminal device, first carrier configuration information sent by the network device according to the first RRC reconfiguration information, wherein the first carrier configuration information is used for indicating a first carrier; and
   sending, by the terminal device, the same PDCP layer data to the network device through the first carrier instead of the secondary carrier on which the RLF event occurs.

3. The method according to claim 1, further comprising:
   sending, by the terminal device, first RLF type indication information to the network device, wherein the first RLF type indication information is used for indicating that a carrier on which the RLF event occurs is the secondary carrier.

4. The method according to claim 1, further comprising:
   suspending, by the terminal device, transmission of data of all RLC entities mapped to the secondary carrier in the situation that the RLF event occurs on the secondary carrier.

5. The method according to claim 1, further comprising:
   suspending, by the terminal device, transmission of data of at least one RLC entity mapped to the secondary carrier in the situation that the RLF event occurs on the secondary carrier, wherein the number of transmissions of the AMD PDU in each RLC entity of the at least one RLC entity reaches to the maximum number of retransmissions.

6. The method according to claim 1, further comprising: maintaining, by the terminal device, an operation of a medium access control (MAC) entity in the situation that the RLF event occurs on the secondary carrier.

7. The method according to claim 1, further comprising: duplicating and transmitting, by the terminal device, a signaling radio bearer (SRB) carried by the secondary carrier with the network device through the primary carrier in the situation that the RLF event occurs on the secondary carrier.

8. The method according to claim 1, further comprising: when the number of transmissions of the AMD PDU in the RLC entity corresponding to the primary carrier reaches to the maximum number of transmissions, determining, by the terminal device, that the RLF event occurs on the primary carrier, and sending an RRC re-establishment request message to the network device, wherein the RRC re-establishment request message is used for requesting RRC re-establishment with the network device.

9. The method according to claim 1, further comprising: receiving, by the terminal device, second carrier configuration information sent by the network device according to the second RRC reconfiguration information, wherein the second carrier configuration information is used for indicating a second carrier; and
sending, by the terminal device, the same PDCP layer data to the network device through the second carrier instead of the primary carrier in the SCG on which the RLF event occurs.

10. The method according to claim 1, further comprising: sending, by the terminal device, second RLF type indication information to the network device, wherein the second RLF type indication information is used for indicating that a carrier on which the RLF event occurs is the primary carrier in the SCG.

11. A terminal device, comprising: a memory and a processor, the memory is used for storing instructions, the processor is used for executing the instructions stored in the memory, and when the processor executes the instructions stored in the memory, the execution causes the processor to:
send same packet data convergence protocol (PDCP) layer data to a network device through a primary carrier and a secondary carrier; and
when a number of transmissions of an acknowledged mode data (AMD) protocol data unit (PDU) in a radio link control (RLC) entity corresponding to the secondary carrier reaches to a maximum number of transmissions, determine that a RLF event occurs on the secondary carrier, and send first radio resource control (RRC) reconfiguration information to the network device, wherein the first RRC reconfiguration information is used for RRC connection reconfiguration performed by the terminal device with the network device,
wherein the primary carrier is a primary carrier in a secondary cell group (SCG), and the secondary carrier is a secondary carrier in the SCG; and the instructions further comprise instructions to:
when the number of transmissions of the AMD PDU in the RLC entity corresponding to the primary carrier in the SCG reaches to the maximum number of transmissions, determining, by the terminal device, that the RLF event occurs on the primary carrier in the SCG, and sending second RRC reconfiguration information to the network device, wherein the second RRC reconfiguration information is used for RRC connection reconfiguration performed by the terminal device with the network device.

12. The terminal device according to claim 11, wherein the processor is further caused to:
receive first carrier configuration information sent by the network device according to the first RRC reconfiguration information, wherein the first carrier configuration information is used for indicating a first carrier; and
send the same PDCP layer data to the network device through the first carrier instead of the secondary carrier on which the RLF event occurs.

13. The terminal device according to claim 11, wherein the processor is further caused to:
send first RLF type indication information to the network device, wherein the first RLF type indication information is used for indicating that a carrier on which the RLF event occurs is the secondary carrier.

14. The terminal device according to claim 11, wherein the processor is further caused to:
suspend transmission of data of all RLC entities mapped to the secondary carrier in the situation that the RLF event occurs on the secondary carrier.

15. The terminal device according to claim 11, wherein the processor is further caused to:
suspend transmission of data of at least one RLC entity mapped to the secondary carrier in the situation that the RLF event occurs on the secondary carrier, wherein the number of transmissions of the AMD PDU in each RLC entity of the at least one RLC entity reaches to the maximum number of retransmissions.

16. The terminal device according to claim 11, wherein the processor is further caused to:
maintain an operation of a medium access control (MAC) entity in the situation that the RLF event occurs on the secondary carrier.

17. The terminal device according to claim 11, wherein the processor is further caused to:
duplicate and transmit a signaling radio bearer (SRB) carried by the secondary carrier with the network device through the primary carrier in the situation that the RLF event occurs on the secondary carrier.

18. The terminal device according to claim 11, wherein the processor is further caused to:
when the number of transmissions of the AMD PDU in the RLC entity corresponding to the primary carrier reaches to the maximum number of transmissions, determine that the RLF event occurs on the primary carrier, and send an RRC re-establishment request message to the network device, wherein the RRC re-establishment request message is used for requesting RRC re-establishment with the network device.

* * * * *